(12) United States Patent
Vald et al.

(10) Patent No.: US 11,818,260 B1
(45) Date of Patent: Nov. 14, 2023

(54) SYSTEMS AND METHODS FOR BLOCKING DECRYPTION CAPABILITIES IN SYMMETRIC KEY ENCRYPTION

(71) Applicant: INTUIT INC., Mountain View, CA (US)

(72) Inventors: Margarita Vald, Tel Aviv (IL); Julia Zarubinsky, Tel Aviv (IL); Yaron Sheffer, Tel Aviv (IL); Sergey Banshats, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/066,868

(22) Filed: Dec. 15, 2022

(51) Int. Cl.
*H04L 9/08* (2006.01)

(52) U.S. Cl.
CPC .......... *H04L 9/0866* (2013.01); *H04L 9/0825* (2013.01); *H04L 9/0894* (2013.01)

(58) Field of Classification Search
CPC .... H04L 9/0866; H04L 9/0825; H04L 9/0894
See application file for complete search history.

(56) References Cited

U.S. PATENT DOCUMENTS

| | | | |
|---|---|---|---|
| 8,005,227 B1* | 8/2011 | Linnell | H04L 9/0894 380/278 |
| 11,233,647 B1* | 1/2022 | Fontaine | H04L 9/3215 |
| 2015/0143111 A1* | 5/2015 | Parann-Nissany | G06F 21/602 713/164 |
| 2018/0248689 A1* | 8/2018 | Hu | H04L 9/0863 |
| 2019/0207769 A1* | 7/2019 | Donohoe | G06F 21/602 |
| 2019/0222424 A1* | 7/2019 | Lindemann | H04L 9/3231 |
| 2020/0112429 A1* | 4/2020 | Keselman | H04L 9/0861 |
| 2021/0250163 A1* | 8/2021 | Vald | H04L 9/008 |
| 2022/0191039 A1* | 6/2022 | Kisley | H04L 9/0637 |
| 2022/0311620 A1* | 9/2022 | Saha | H04L 9/0819 |
| 2022/0400006 A1* | 12/2022 | Hunsberger | H04W 12/041 |

* cited by examiner

*Primary Examiner* — J. Brant Murphy
(74) *Attorney, Agent, or Firm* — DLA PIPER LLP (US)

(57) ABSTRACT

Systems and methods that may be used to provide policies and protocols for blocking decryption capabilities in symmetric key encryption using a unique protocol in which key derivation may include injecting a random string into each key derivation. For example, a policy may be assigned to each client device indicating whether the client device has been assigned encryption only permission or full access permission to both encrypt and decrypt data. The disclosed protocol prevents client devices with encryption only permission from obtaining keys for decryption.

20 Claims, 4 Drawing Sheets

SYSTEMS AND METHODS FOR BLOCKING DECRYPTION CAPABILITIES IN SYMMETRIC KEY ENCRYPTION

BACKGROUND

Many computer applications require cryptographic operations for multiple clients, users, or processes. For example, multiple clients may require separate keys for accessing applications hosted by servers or cloud-based systems through one or more networks. To enhance security in case of a breach, server/cloud-side key management systems may be separated. For example, if an attacker breaches one key server, he/she may only gain a small number of the total keys, and may have to breach additional servers separately to gain the remaining keys.

Due to their complexity, currently existing key management services require separate groups of servers per project and therefore introduce tremendous overall costs due to the additional hardware and overhead. These services also require large storage resources to store the numerous keys being managed and used for encryption and decryption purposes, and the storage of encrypted data. Moreover, these services utilize complex exponential processing during key generation and derivation processing, meaning that they are also processor intensive.

Further still, conventional access permission protocols are binary, such that a user either is granted full access to a key and can therefore encrypt and decrypt data or has no access to a key at all. However, in some instances, granting a user encryption only permissions are needed or would be beneficial for a specific task. But there are no mechanisms that allow encryption only permissions for symmetric encryption schemes. As such, under conventional approaches, when a user requires encryption permission, full access is provided to that user, which violates the principle of least privilege (i.e., a concept in computer security that limits users' access rights to only what are strictly required to do their jobs). As can be appreciated, all of these results are undesirable.

Accordingly, there is a need and desire for a new and improved key derivation process that overcomes the shortcomings of today's key management services.

DETAILED DESCRIPTION OF SEVERAL EMBODIMENTS

Figure 1:
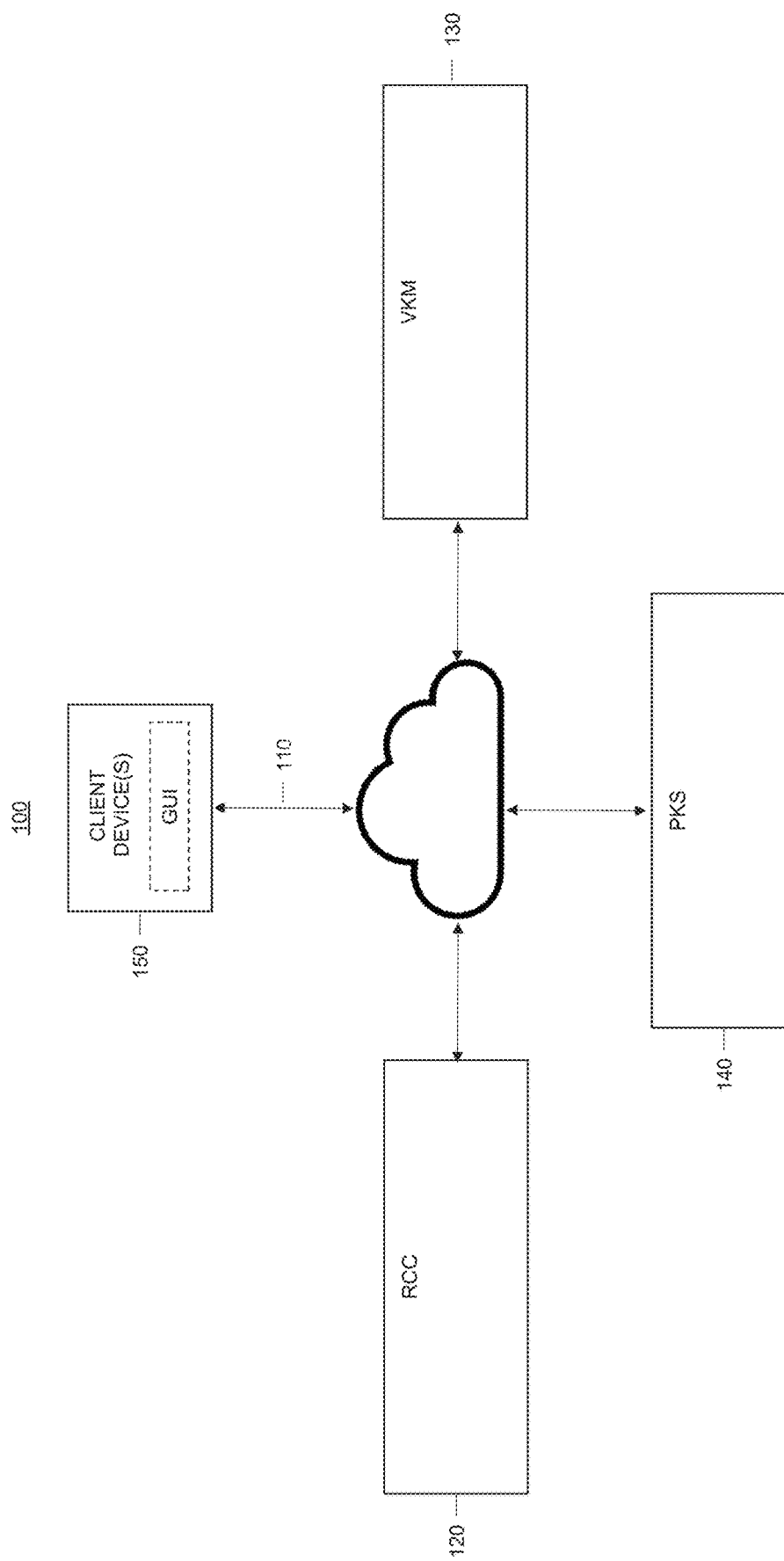
FIG. 1 shows an example system configured to perform multitenant key derivation according to an embodiment of the present disclosure.

Many conventional methods lack the proper protocols to prevent a malicious server from being forced to derive a key to a value of its choice. For example, in one conventional approach, Oblivious Pseudorandom Function (OPRF) is a two-party protocol for computing the output of a pseudorandom function (PRF). One party (the server) holds the PRF secret key, and the other (the client) holds the PRF input. The 'obliviousness' property ensures that the server does not learn anything about the client's input during the evaluation. In OPRF systems, there is no distinction between derivation for encryption protocols and derivation for decryption protocols, thus these protocols cannot be used to block decryption. As such, a malicious OPRF server could be forced to derive a key to enable decryption, thereby violating a vital security property that is required by most security/intrusion detection and prevention systems.

In contrast to conventional approaches, the disclosed solution may involve a key derivation protocol and management system that implements a unique protocol in which (remote) key derivation may be executed between the server that holds the root key and a client that holds the derivation data and obtains an encryption key. The key derivation protocol may include two separate derivation paths, one path that derives a key for encryption and a second path that derives a key for decryption. The disclosed solution combines the key derivation protocol with a policy that blocks the decryption path. Some embodiments described herein may enable the blocking of decryption permissions for users that should not have permission to decrypt on given system, using a novel key derivation protocol that derives a new key with a random string for each derivation encryption request. The generation of a new key with a random string enables the disclosed key derivation protocol and management system to block decryption requests from certain entities, while simultaneously enabling the key derivation protocol and management system to benefit from the efficiency of symmetric key encryption techniques.

Moreover, in one or more embodiments, the derivation data may be hashed and may include some information, potentially secret, associated with the data to be encrypted. The use of the hashed data and processing disclosed herein provides the advantage of simplifying the computations used throughout the process such as e.g., by removing complex derivation computations that utilize exponents and exponential processing. Instead, the principles disclosed herein are based on simplified probabilistic and multiplication operations rather than complex exponential processing, reducing the load on the processors when carrying out the disclosed protocol. In addition, the hashed data and processing disclosed herein allow for the use of very short headers when encrypted data (e.g., ciphertext) is stored. Thus, the principles disclosed herein require significantly less storage resources to store the keys being managed and used for encryption and decryption purposes.

Moreover, the disclosed protocol ensures that the server does not get access to or learn anything about the client's derived key, while the client does not get access to or learn anything about the server's root key. Significantly, the server cannot force the derived key to a value of its choice. These features allow the protocol to run simultaneous mutually distrustful key derivation processes on the same cluster of machines, thereby reducing the number of servers needed when keys for multiple projects are being derived and or managed.

In one or more embodiments, the protocol may be executed between a client computing device and one or more server computing devices in communication with the client computing device. In one or more embodiments, the protocol may have the following high-level structure: (1) the client computing device may provide blinded and or hashed derivation data, while the one or more server computing devices (2) may provide an encrypted key, and (3d) may compute a derived key based on the root key injected with a random string, and the derivation data. In one or more embodiments, the derived key may be blinded when on the one or more server computing devices, meaning that the one or more server computing devices will not have access to the cleartext derived key, and can only be unblinded (revealed) by the client.

FIG. 1 shows an example system 100 configured to perform multitenant key derivation according to an embodiment of the present disclosure. In the illustrated example, the system 100 includes elements such as a remote crypto cluster (RCC) 120, virtual key manager (VKM) 130, project key server (PKS) 140, and/or at least one client device 150. Each of these elements may include one or more physical computing devices. In one or more embodiments, the RCC 120 may be merged into the VKM 130. In some embodiments, the client device 150 may be any device configured to provide access to remote applications. For example, the client device 150 may be a smartphone, personal computer, tablet, laptop computer, or other device. It should be appreciated that the disclosed principles should not be limited to the illustrated example and that they can be applied to one or more server computing devices that are separate from a client computing device.

The elements may communicate with one another through at least one network 110. Network 110 may be the Internet and/or other public or private networks or combinations thereof. For example, in some embodiments, at least the RCC 120, VKM 130, and PKS 140 may communicate with one another over secure channels (e.g., one or more TLS/SSL channels). In some embodiments, communication between at least some of the elements of the system 100 may be facilitated by one or more application programming interfaces (APIs). APIs of the system 100 may be proprietary and/or may be examples available to those of ordinary skill in the art such as Amazon® Web Services (AWS) APIs or the like.

Specific examples of the processing performed by the elements of the system 100 in combination with one another are given below with respect to the key derivation encryption process 200 illustrated in FIG. 2, and the key derivation decryption process 300 illustrated in FIG. 3.

The RCC 120, VKM 130, PKS 140, and client device 150 are each depicted as single devices for ease of illustration, but those of ordinary skill in the art will appreciate that the RCC 120, VKM 130, PKS 140, and/or client device 150 may be embodied in different forms for different implementations. For example, the RCC 120 may be merged into the VKM 130 and they may reside on one or more computing devices. In other embodiments, the RCC 120, VKM 130, and/or PKS 140 may include a plurality of devices. In another example, a plurality of client devices 150 may be connected to the network 110 and may use the key derivation services described herein. Furthermore, as noted above, the network 110 may be a single network or a combination of networks, which may or may not all use similar communication protocols and/or techniques.

Figure 2:
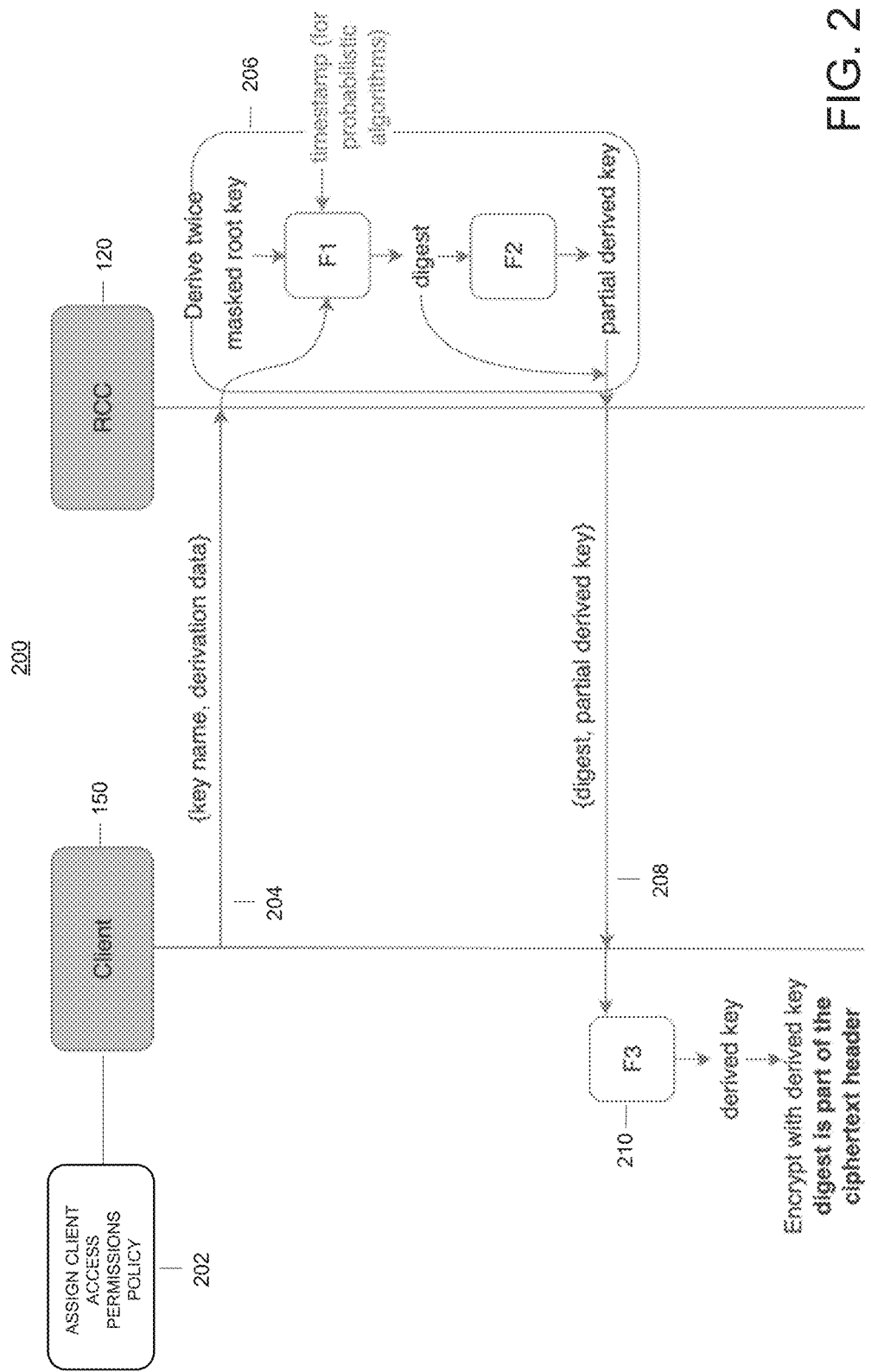
FIG. 2 shows an example key derivation encryption process according to an embodiment of the present disclosure.

FIG. 2 shows an example key derivation encryption process 200 according to an embodiment of the present disclosure. The entire system 100 may work together to perform process 200 in a distributed manner. The process 200 may consist of a derive twice application programming interface (API). In accordance with the disclosed principles, the client device 150 may provide blinded and or hashed derivation data, the VKM 130 may provide an encrypted key, and the RCC 120 may compute a derived key based on the root key and the derivation data. In one or more embodiments, the derived key may be blinded when on the RCC, 120 meaning that the RCC 120 will not have access to the cleartext derived key, and can only be unblinded (revealed) by the client device 150. This arrangement will yield a low-cost, multitenant system 100 with strong protection of stored and/or managed data. The process 200 is presented as deriving a single new key per derivation request and it should be appreciated that process 200 may be repeated as new derivation requests are received.

Some portions of process 200 and other processes discussed herein are described as using specific equations. However, it will be clear to those of ordinary skill in the art that some portions of process 200 may be performed with modifications to the example equations and/or with different processing altogether. The following definitions may be useful for understanding the example equations presented herein:

n is the number of clients.

For i∈[n], $C_i$ is the i'th client and $b_i$ is the blinding value associated with client $C_i$. A blinding value $b_i$ is added to and or processed with other data to form blinded data, which can only be unblinded using the blinding value $b_i$.

$\ell$ is the number of root keys in the project.

For j∈[ $\ell$ ], $z_j$, $v_j$, and $t_j$ are respectively the j'th RCC root key and additional variables used for derivation with $z_j$. The length of $z_j$, $v_j$, and $t_j$ is 2,048 bits.

DD is the derivation data supplied by the client.

(vsk, vpk) is the VKM's key pair for RSA encryption. These keys are generated once and vpk is known to all entities in the system.

(sk, vk) is the PKS' key pair for an RSA signature scheme. These keys are generated once and vk is known to all entities in the system.

p is a 2,048 bit prime number generated once and is known to all entities in the system.

K is the project key (i.e., master key) that is generated in $\mathbb{Z}_p$.

w is a project-wide client key that is shared among all clients and has a length of 2,048 bits.

pks-project-key-version is the latest project key version generated by the PKS.

vkm-project-key-version is the latest project key version received by VKM.

key-update-value is the ratio of the current project-key and previous project key.

At 202, client device 150 is assigned a policy that defines access permissions to the APIs defined by the key derivation protocol. For example, client device 150 may assigned a policy the permits the client device 150 either full access (i.e., to both encrypt and decrypt) or to encrypt only.

At 204, the client device 150 sends an encryption derive request to the RCC 120. In some instances, the request may be transmitted to the RCC 120 with a master key (which may be masked/blinded), a key name, and derivation data. Derivation data may include but is not limited to a table name, column name, and/or data included in a table or column.

At 206, once the derive request is received at the RCC 120, the RCC computes a digest parameter as the keyed hash function of $v_j$ and d (i.e., digest=HKDF($v_j$, d, 48)). The RCC 120 may also compute a modified d parameter (i.e., $\bar{d}$) as the keyed hash function of $v_j$ and digest (i.e., $\bar{d}$=HKDF($v_j$, digest, 2048)·$z_j$·$b_i^1$).Here, the RCC 120 may additionally generate a random string and inject it into the digest calculation. The random string may be one or more of a timestamp, a random phrase, a predictable phrase, a series of numbers, and/or a series of random alphanumeric characters that have no particular pattern. The injection of the random string into the digest ensures that a fresh key is created that cannot be subsequently used for decryption. The random string may be generated according to predefined rules. For example, the random string may be generated at predetermined time intervals (e.g., every second, minute, hour, day, etc.). In addition, or alternatively, the random string may be generated subject to predetermined rules related to the needs of a project or the required permissions of a particular user or team.

At 208, the RCC 120 sends a message "message (Remote-derive-Client, digest, $\overline{d}$)" to the client device 150 ($C_i$) requesting that the client compute a derived key. The message (Remote-derive-Client, digest, $\overline{d}$) may send the parameters digest and $\overline{d}$, to the client device 150 ($C_i$) along with a partially derived key (i.e., "partial derived key"). In the illustrated embodiment, the RCC 120 is shown as performing step 208, but it should be appreciated that this step may be performed by the VKM 130, particularly if the RCC 120 is merged into the VKM 130.

At 210, after receiving the message (Remote-derive-Client, digest, $\overline{d}$), the client device 150 ($C_i$) computes the derived key dd as the hash function of w⊕$t_j$ and $\overline{d}·b_i$ (i.e., dd=HKDF((w⊕$t_j$, $\overline{d}·b_i$, 256/128). In addition, the client device 150 ($C_i$) may encrypt the message m using the derived key dd and store the digest and ciphertext.

According to the process 200, blinded and or hashed derivation data DD (e.g., from the client and only known by the client) and an encrypted key (e.g., from the VKM) may be used to compute a derived key (e.g., by the RCC or VKM) that is blinded when on the RCC (or VKM). This means that the computing device implementing the VKM and RCC does not get access to or learn anything about the client's derived key, while the client does not get access to or learn anything about the server's root key. As such, privacy is ensured throughout the encryption, storage and decryption of the message m. Moreover, as discussed in more detail below in relation to FIG. 3, this additionally ensures that the derived key cannot be used for decryption in one or more downstream processes.

Figure 3:
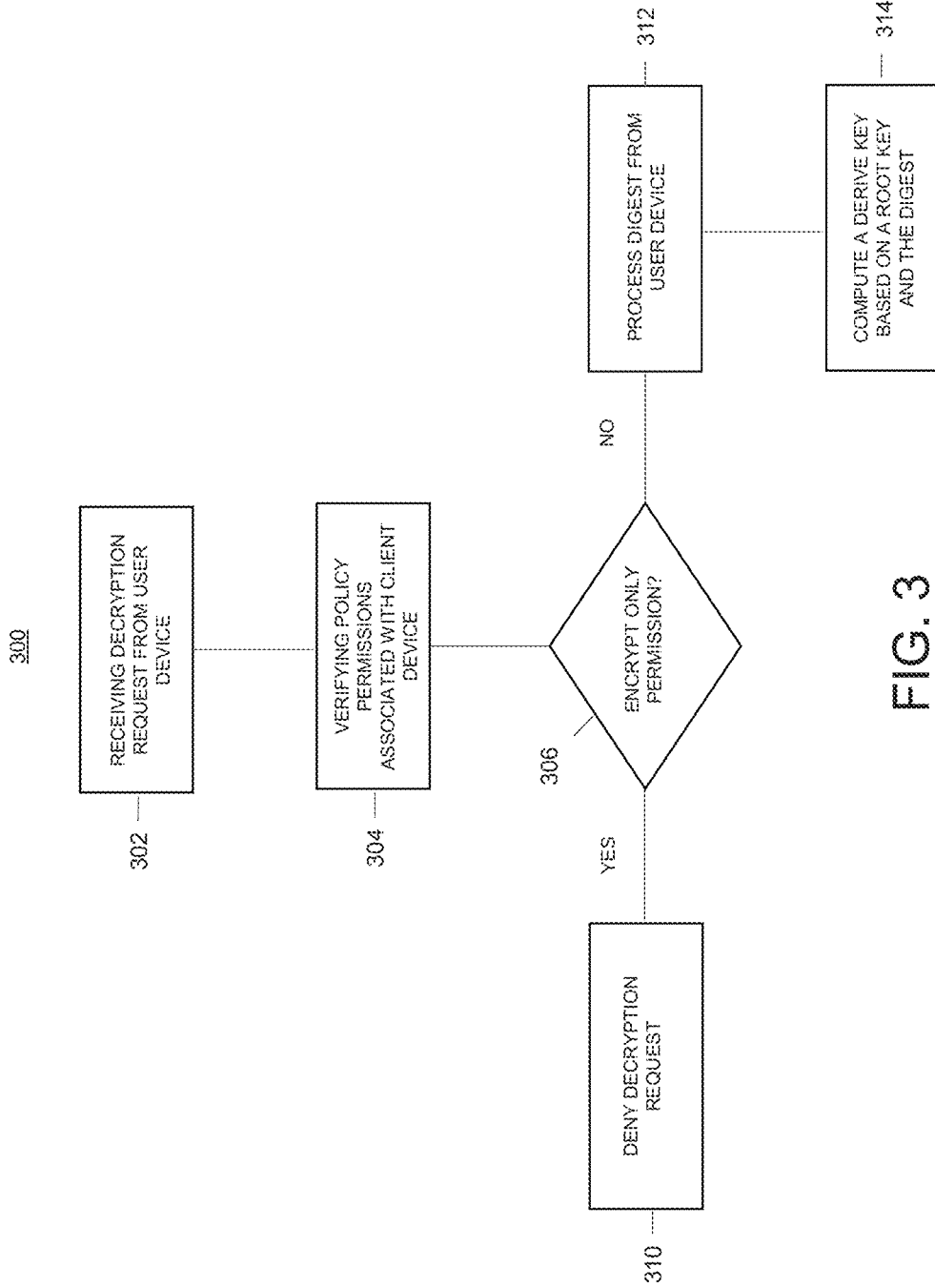
FIG. 3 shows an example process for computing a derived key according to an embodiment of the present disclosure.

FIG. 3 shows an example process for computing a derived key 300 according to an embodiment of the present disclosure. The entire system 100 may work together to perform process 300 in a distributed manner.

At 302, the client device 150 ($C_i$) sends a decryption derive request (Remote-derive-VKM, d, $e_i$, $\sigma_i$, key-name) to the RCC 120. Here, the client device 150 may identify the ciphertext stored on the client device 150 and extract a digest from the header of the ciphertext. The decryption derive request may include a key name and digest data.

At 304, once the request is received at the RCC 120, a policy assigned to client device 150 is verified at the RCC 120 before the message is processed by the VKM 130. For example, upon receiving the decryption derive request (Remote-derive-VKM, d, $e_i$, $\sigma_i$, key-name), the VKM 130 may verify the policy assigned to the client device 150.

At 306, if it is determined that the client device 150 was assigned an encryption only policy, then the decryption derive request is denied at 310, at which point process 300 terminates.

Alternatively, if at 306, if it is determined that the policy assigned to client device 150 was assigned full access permission (i.e., both encryption and decryption permission), then the decryption derive request is processed at 312.

At 314, the RCC 120 computes the digest parameter as the keyed hash function of $v_j$ and d (i.e., digest=HKDF($v_j$, d, 48)). The RCC 120 may also compute a modified d parameter (i.e., $\overline{d}$) as the keyed hash function of $v_j$ and digest (i.e., $\overline{d}$=HKDF($v_j$, digest, 2048)·$z_j$·$b_i^1$). In addition, the RCC 120 may send a message "message (Remote-derive-Client, digest, $\overline{d}$)" to the client device 150 ($C_i$) requesting that the client compute a derived key. The message (Remote-derive-Client, digest, $\overline{d}$) may send the parameters digest and $\overline{d}$ to the client device 150 ($C_i$). While this embodiment has been discussed with RCC 120 as performing steps 302-314, it should be appreciated that this process 300 may be performed by the VKM 130, particularly if the RCC 120 is merged into the VKM 130.

Figure 4:
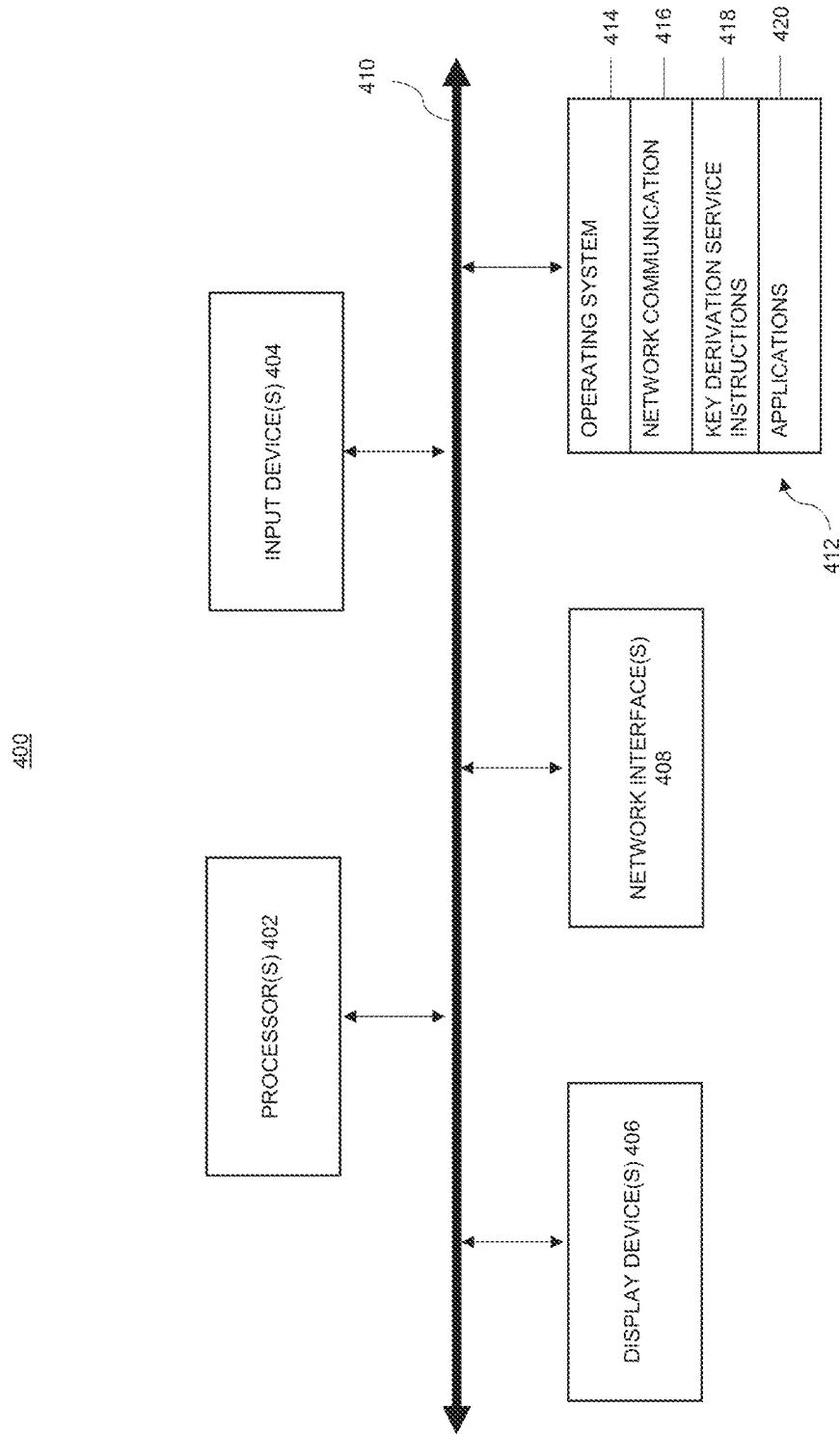
FIG. 4 shows an example computing device according to an embodiment of the present disclosure.

FIG. 4 is a block diagram of an example computing device 400 that may implement various features and processes as described herein. For example, in some embodiments the computing device 400 may function as the RCC 120, VKM 130, PKS 140, or client device 150, or a portion of any of these elements. The computing device 400 may be implemented on any electronic device that runs software applications derived from instructions, including without limitation personal computers, servers, smart phones, media players, electronic tablets, game consoles, email devices, etc. In some implementations, the computing device 400 may include one or more processors 402, one or more input devices 404, one or more display devices 406, one or more network interfaces 408, and one or more computer-readable mediums 412. Each of these components may be coupled by a bus 410.

The display device 406 may be any known display technology, including but not limited to display devices using Liquid Crystal Display (LCD) or Light Emitting Diode (LED) technology. The processor(s) 402 may use any known processor technology, including but not limited to graphics processors and multi-core processors. The input device 404 may be any known input device technology, including but not limited to a keyboard (including a virtual keyboard), mouse, track ball, and touch-sensitive pad or display. The bus 410 may be any known internal or external bus technology, including but not limited to ISA, EISA, PCI, PCI Express, USB, Serial ATA or FireWire. The computer-readable medium 412 may be any non-transitory medium that participates in providing instructions to the processor(s) 402 for execution, including without limitation, non-volatile storage media (e.g., optical disks, magnetic disks, flash drives, etc.), or volatile media (e.g., SDRAM, ROM, etc.).

The computer-readable medium 412 may include various instructions for implementing an operating system 414 (e.g., Mac OS®, Windows®, Linux). The operating system may be multi-user, multiprocessing, multitasking, multithreading, real-time, and the like. The operating system may perform basic tasks, including but not limited to: recognizing input from the input device 404; sending output to the display device 406; keeping track of files and directories on the computer-readable medium 412; controlling peripheral devices (e.g., disk drives, printers, etc.) which can be controlled directly or through an I/O controller; and managing traffic on the bus 410. The network communications instructions 416 may establish and maintain network connections (e.g., software for implementing communication protocols, such as TCP/IP, HTTP, Ethernet, telephony, etc.).

The key derivation service instructions 418 may include instructions that perform the various multitenant key derivation functions as described herein. The key derivation service instructions 418 may vary depending on whether the computing device 400 is functioning as the RCC 120, VKM 130, PKS 140, or client device 150. For example, the RCC 120 may include key derivation service instructions 418 for requesting data from other devices and using it to compute a blinded derived key. The client device 150 may include key derivation service instructions 418 for generating public/private key pairs and using the private key to decrypt the blinded derived key. The VKM 130 and/or PKS 140 may include key derivation service instructions 418 for generating and/or transmitting data used throughout the process 200, process 300 and or required by other devices.

The applications 420 may be an application that uses or implements the processes described herein and/or other processes. The processes may also be implemented in the operating system 414.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for implementing a protocol for blocking a decryption derive request comprising:

assigning an encryption only policy to a client device;
receiving an encryption derive request from the client device;
generating a random string according to one or more predefined rules;
generating a digest parameter based on the random string and a masked secret key;
generating a blinded partial derived key based on the digest parameter; and
transmitting the blinded partial derived key to the client device, the blinded partial derived key being configured to generate a derived key for encrypting data.

2. The computer implemented method of claim 1, wherein the encryption only policy defines access permissions associated with the protocol for blocking decryption.

3. The computer implemented method of claim 1, wherein the encryption derive request further includes a key name and derivation data.

4. The computer implemented method of claim 3, wherein the derivation data is blinded, such that a server receiving the derivation data will not have access to clear text included with the derivation data.

5. The computer implemented method of claim 1, wherein the random string is one or more of a timestamp, a random phrase, a predictable phrase, a series of numbers, and/or a series of random alphanumeric characters.

6. The computer implemented method of claim 1, wherein the random string is generated according to one or more predefined rules, including at least generating the random string at predetermined time intervals.

7. The computer implemented method of claim 1, wherein the digest parameter is further configured to be stored with the derived key in a ciphertext.

8. A system including at least one server comprising a storage device and one or more processors configured to implement a protocol for blocking decryption comprising:
   assigning an encryption only policy to a client device;
   receiving an encryption derive request from the client device;
   generating a random string according to one or more predefined rules;
   generating a digest parameter based on the random string and a masked secret key;
   generating a blinded partial derived key based on the digest parameter; and
   transmitting the blinded partial derived key to the client device, wherein the partial derived key is configured to generate a derived key for encrypting data.

9. The system of claim 8, wherein the encryption only policy defines access permissions associated with the protocol for blocking decryption.

10. The system of claim 8, wherein the encryption derive request further includes a key name and derivation data.

11. The system of claim 10, wherein the derivation data is blinded, such that a server receiving the derivation data will not have access to clear text included with the derivation data.

12. The system of claim 8, wherein the random string is one or more of a timestamp, a random phrase, a predictable phrase, a series of numbers, and/or a series of random alphanumeric characters.

13. The system of claim 8, wherein the random string is generated according to one or more predefined rules including at generating the random string at predetermined time intervals.

14. The system of claim 8, wherein the digest parameter is further configured to be stored with the derived key in a ciphertext.

15. A computer implemented method for implementing a protocol for blocking decryption comprising:
   receiving an encryption derive request from a client device;
   generating a random string according to one or more predefined rules;
   generating a digest parameter based on the random string and a masked secret key;
   generating a blinded partial derived key based on the digest parameter; and
   transmitting the blinded partial derived key to the client device, the blinded partial derived key being configured to generate a derived key for encrypting data.

16. The computer implemented method of claim 15, further comprises assigning an encryption only policy to the client device, wherein the encryption only policy defines access permissions associated with the protocol for blocking decryption.

17. The computer implemented method of claim 15, wherein the encryption derive request further includes a key name and derivation data.

18. The computer implemented method of claim 17, wherein the derivation data is blinded, such that a server receiving the derivation data will not have access to clear text included with the derivation data.

19. The computer implemented method of claim 15, wherein the random string is one or more of a timestamp, a random phrase, a predictable phrase, a series of numbers, and/or a series of random alphanumeric characters.

20. The computer implemented method of claim 15, wherein the random string is generated according to one or more predefined rules, including at least generating the random string at predetermined time intervals.

* * * * *